Sept. 7, 1943.   C. L. BRACKETT   2,328,706
VALVE TAPPET
Filed May 25, 1939
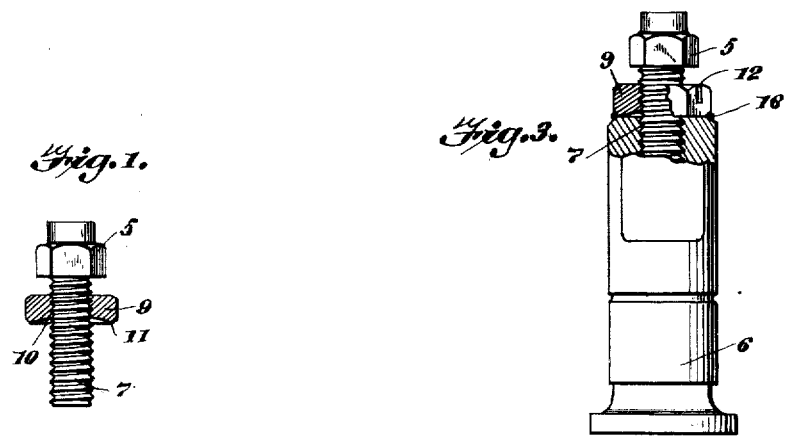
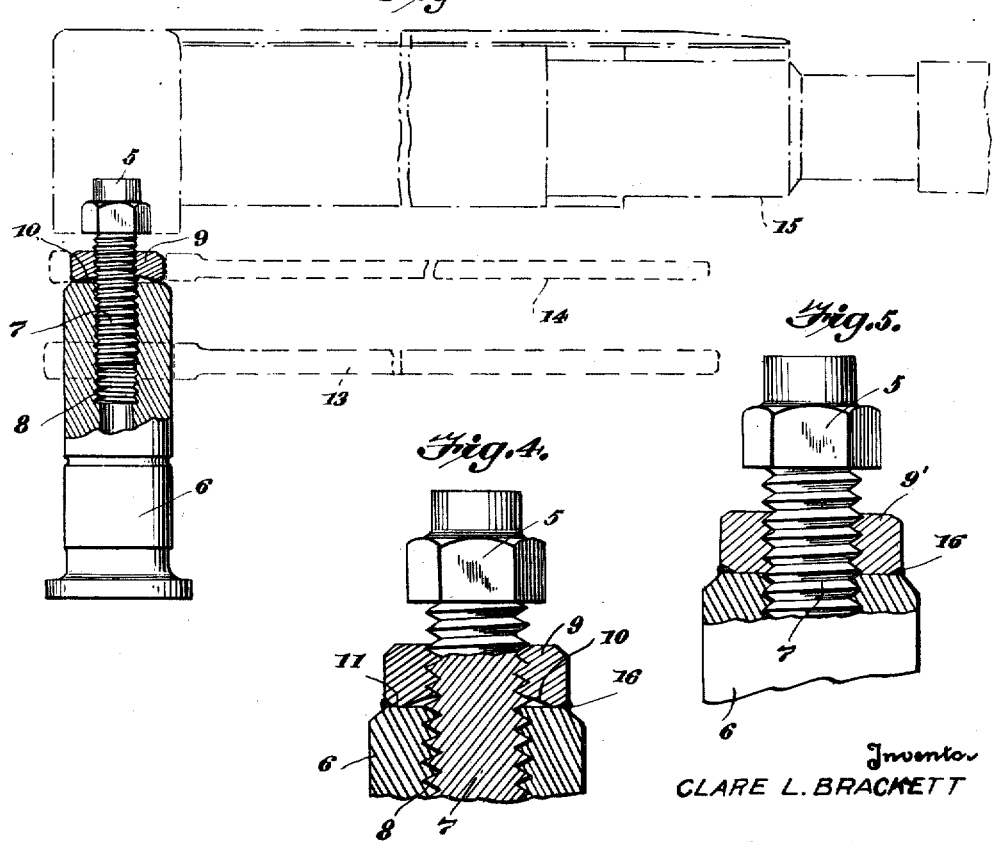
Inventor
CLARE L. BRACKETT Patented Sept. 7, 1943

2,328,706

UNITED STATES PATENT OFFICE 2,328,706

VALVE TAPPET

Clare L. Brackett, Detroit, Mich.

Application May 25, 1939, Serial No. 275,754

4 Claims. (Cl. 151—21)

This invention relates to the art of screw threaded elements, and particularly to engaged complemental screw threaded elements which are to be locked in positions of adjustment. A common manner of locking such an assembly is by the employment of a jam nut, also termed a tension nut, in threaded engagement with one member and bearing against an abutment on the other whereby to set up an axial tension in the assembly, by which the threads are placed under tension and thus bind the respective members against relative rotation. The degree of tension is determinable by measurement of the torque required to effect rotation of one of the elements. Thus, within the tensile limits of the threads, it is theoretically possible to establish any desired tension.

It is, however, a practical impossibility with the means of prior art practice to maintain an established tension over extended periods of time and use. This is especially true wtih assemblies such as valve lifter tappet screws and nuts, and the like, which are subjected to such constant shock and vibration in service that the tension nuts soon become loosened; the tension being thereupon immediately destroyed. Furthermore, in such assemblies the engaged elements may not be moved axially relative to each other through any appreciable extent without affecting the position of the nut and thus causing a variation from the established tension.

An object of this invention is to provide means for locking and maintaining engaged screw threaded elements at an established thread tension unaffected by duration or conditions of service.

Another object is to provide in an assembly of engaged screw threaded elements capable of relative axial movement, means for setting up a predetermined desired thread tension therebetween and maintaining the same irrespective of the frequency and extent of axial movement of either member relative to the other.

Still another object is to provide a novel tappet screw assembly having means operative independently of either the screw or its lifter socket to create and maintain throughout the life of the assembly a desired degree of tension on the engaged threads thereof.

A further object is to provide in a tappet assembly a novel means for locking the parts under a desired screw thread tension, and which permits axial adjustment of the screw in the other socket without in any way disturbing the established tension.

Other objects will be readily apparent to those skilled in the art.

Although not restricted thereto, the invention is particularly useful as applied in valve lifter tappet screw assemblies and the like. For purposes of illustration such an assembly is shown in the accompanying drawing and described herein, but it is to be understood that within the scope of the invention as claimed all disclosed details of structure may be varied as desired.

In the drawing:

Figure 1 is an elevation of a valve lifter tappet screw with a tension nut as initially positioned thereon.

Figure 2 is an axial section, partly in elevation, of an assembly before tightening the tension nut.

Figure 3 is an elevation, partly in axial section, of the completed assembly, showing the nut under stress as assembled.

Figure 4 is an enlarged axial section through the upper portion of the complete assembly shown in Figure 3.

Figure 5 is a section similar to Figure 4 but illustrating the use of a different type of nut.

In structural detail the assembly comprises a pair of complementally threaded members 5 and 6 in connected engagement, with a threaded stem 7 on the male member 5 received in a threaded axial socket 8 in the female member 6. A tension nut 9 is threaded onto the stem 7 and is axially adjustable thereon to bear against an abutment on a female member, which abutment is conveniently the adjacent end of the member 6. When the nut 9 is rotated on the stem 7 and forced against the abutment on the female member the two members will be forced axially in opposite directions outwardly with respect to the assembly, creating an axial tension on the engaged screw threads in the known manner of such nuts.

In the disclosed embodiment the male member 5 is a valve tappet screw and the female member 6 is its lifter; both are of conventional construction and operation in service. The nut 9 shown in Figures 1-4 is preferably, but not necessarily, of the form shown in United States Patent No. 1,734,445 of Nov. 5, 1929; with its bottom face having a concave area 10 surrounding its bore and having a flat peripheral zone 11 of relatively short radial extent which bears against the flat shoulder formed by the upper end of the lifter socket. A series of radial slots, one of which is shown as at 12 in Figure 3, extend through its upper half portion from the hexagonal sides to its bore. The top and bottom peripheral edges of the nut are preferably chamfered, as is also the end of the lifter.

In effecting the assembly the nut 9 is applied to the stem of the tappet screw 5 at approximately the position it will occupy when the tappet is adjusted; this step is illustrated in Figure 1. The stem of the screw is next threaded into the bore of the lifter socket 6, and by the aid of proper tools such as wrenches 13, 14 and 15 applied, respectively, to the lifter, the nut and the screw, the nut is tightened down against the adjacent end of the lifter against which it bears. This step is illustrated in Figure 2.

Figure 4 makes clear that when the nut is tightened the tappet screw stem 7 will be forced axially outwardly with respect to the lifter socket so that the upper inclined faces of the threads on the tappet screw will bear tightly against the inclined lower faces of the lifter socket threads, creating an axial tension in the threads which increases correspondingly with an increase in the pressure at which the nut is forced against the end of the lifter socket due to the resilience of the nut. At the same time, the flat face portion 11 of the nut provides a fulcrum on which the slotted upper portion of the nut tends to rock radially inward as the nut is tightened. This action causes the upper part of the nut to bear tightly against the tappet screw stem with the nut threads being fully seated in the stem threads, as shown in Figure 4, and sets up a radial tension in addition to the axial tension.

The degree of tension can be measured by means of a conventional torque wrench which may be the wrench 15 applied to the head of the tappet screw, and in this manner the nut may be operated to establish any desired tension, as the tension is proportional to torque. The torque in valve tappet screw assemblies varies usually between 82 to 110 inch pounds, as approximate limits established by good engineering practice, and by the practice of this invention it is possible to keep the torque definitely within any predetermined given range.

When the desired tension has been established the nut is permanently fixed against rotation. Preferably this anchoring of the nut is accomplished by spot welding, as at 16, over the adjacent chamfered areas of the nut bottom and the end of the lifter. By this means the nut is welded to the lifter and becomes, in effect, an integral part thereof. It is rendered incapable of movement with respect either to the lifter or to the tappet screw.

The final axial adjustment of the tappet screw 5 is then made, and it is an important feature of this invention that the screw may be moved axially in the lifter socket to any desired extent without in any way affecting the thread tension previously established by adjustment of the tension nut and its permanent fixation with respect to the lifter.

The embodiment shown in Figure 5 is identical with that of Figures 1 to 4 except that the nut 9' is a plain check nut with a flat bottom face. The elements which correspond to those of the preceding views are designated by the same reference characters.

It will be apparent that due to the impossibility of relative movement between the nut and lifter, after the nut has been adjusted and permanently fixed thereon, the thread tension or torque, once established at the desired degree, will remain at that same degree throughout the life of the assembly and will be unaffected by shocks and vibrations incident to service.

I claim:

1. A valve lifter tappet screw assembly comprising a lifter, a tappet screw in threaded adjustable engagement therewith, a tension nut on the screw and tensioned against the lifter to establish a desired thread tension between the screw and lifter, and means fixedly securing said nut to said lifter while the nut is under the established tension to maintain such tension and at the same time permit adjustment of said tappet screw.

2. A valve lifter tappet screw assembly comprising a lifter, a tappet screw in threaded adjustable engagement therewith, a tension nut on the screw externally of the lifter and tensioned against the lifter to establish a desired thread tension between the screw and lifter, and said nut being welded in place on the lifter while under tension and in the position at which the desired thread tension is established to maintain such tension and at the same time permit adjustment of said tappet screw.

3. A valve lifter tappet screw assembly comprising a lifter, a tappet screw in threaded adjustable engagement therewith, tensioning means cooperatively associated with both and being initially rotatable relative to both to establish a desired thread tension between the two, and said means being permanently and fixedly connected to one in the position at which the desired tension is established.

4. A valve lifter tappet screw assembly comprising a lifter, a tappet screw in threaded adjustable engagement therewith, tensioning means initially rotatable on the screw externally of the lifter into bearing engagement against the lifter to impart an axial thread tension between said screw and lifter, and means permanently and rigidly connecting said tensioning means to said lifter in the position of established thread tension to maintain such tension while permitting adjustment of said tappet screw.

CLARE L. BRACKETT.